United States Patent
Ally et al.

(10) Patent No.: US 7,757,508 B2
(45) Date of Patent: Jul. 20, 2010

(54) SUPER ENERGY SAVER HEAT PUMP WITH DYNAMIC HYBRID PHASE CHANGE MATERIAL

(75) Inventors: Moonis Raza Ally, Oak Ridge, TN (US); John Jager Tomlinson, Knoxville, TN (US); Clifford Keith Rice, Clinton, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 1106 days.

(21) Appl. No.: 11/162,167

(22) Filed: Aug. 31, 2005

(65) Prior Publication Data
US 2007/0044494 A1    Mar. 1, 2007

(51) Int. Cl.
*F25D 23/00*    (2006.01)

(52) U.S. Cl. .......................... 62/271; 62/434; 62/238.6; 62/61; 62/260; 62/93; 62/94; 62/324.1; 62/160; 165/45

(58) Field of Classification Search ................ 62/434, 62/238.6, 61, 260, 238.7, 186, 271, 324.1, 62/160, 93, 94; 165/45
See application file for complete search history.

(56) References Cited

U.S. PATENT DOCUMENTS

| | | | | |
|---|---|---|---|---|
| 4,237,859 A | * | 12/1980 | Goettl | 126/400 |
| 4,327,560 A | * | 5/1982 | Leon et al. | 62/260 |
| 5,207,075 A | | 5/1993 | Gundlach | |
| 5,348,080 A | * | 9/1994 | Kuroda et al. | 165/104.13 |
| 5,875,644 A | * | 3/1999 | Ambs et al. | 62/324.6 |
| 5,950,447 A | * | 9/1999 | Maeda et al. | 62/271 |
| 6,116,330 A | * | 9/2000 | Salyer | 165/48.2 |
| 6,463,738 B1 | * | 10/2002 | Pinkerton et al. | 60/646 |
| 6,615,601 B1 | | 9/2003 | Wiggs | |
| 6,615,602 B2 | | 9/2003 | Wilkinson | |
| 2003/0037557 A1 | * | 2/2003 | Ito et al. | 62/238.3 |
| 2003/0066638 A1 | | 4/2003 | Qu et al. | |
| 2003/0221436 A1 | | 12/2003 | Xu | |

* cited by examiner

*Primary Examiner*—Frantz F. Jules
*Assistant Examiner*—Azim Rahim
(74) *Attorney, Agent, or Firm*—Brinks Hofer Gilson & Lione

(57) ABSTRACT

A heat pump has a refrigerant loop, a compressor in fluid communication with the refrigerant loop, at least one indoor heat exchanger in fluid communication with the refrigerant loop, and at least one outdoor heat exchanger in fluid communication with the refrigerant loop. The at least one outdoor heat exchanger has a phase change material in thermal communication with the refrigerant loop and in fluid communication with an outdoor environment. Other systems, devices, and methods are described.

19 Claims, 5 Drawing Sheets

SUPER ENERGY SAVER HEAT PUMP WITH DYNAMIC HYBRID PHASE CHANGE MATERIAL

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

BACKGROUND OF THE INVENTION

Buildings account for one third of the country's total primary energy consumption, including two-thirds of the electricity consumption, and one third of the natural gas consumption. Consequently, our nation's buildings are responsible for 35% of carbon dioxide emissions. Manufacturers of HVAC equipment are seeking performance improvements to gain market share. This invention fulfills many attributes for residential and commercial heating and cooling technologies over the next 50 years. It will significantly reduce primary energy consumption, will enable substantially higher performance, will use off-the-shelf components, and will reduce emissions due to lower energy consumption. HVAC industry is eager to license enabling technology.

This invention teaches a Super Energy Saver Heat Pump built by coupling existing heat pumps with a broad class of hybrid PCMs that allow greater exchange of energy with the environment to enable space conditioning at higher efficiency compared to current HVAC systems. The PCMs include materials that undergo solid to liquid as well as liquid to vapor phase transitions, soaking up huge amounts of energy per unit quantity (weight) of PCM. The well known state-of-the-art inorganic salt hydrates have low thermal energy storage capacity typically in the range of 170-308 kJ/kg and are limited to certain discrete temperatures which are difficult to match with existing heat pump cycle temperatures. The PCM in the subject invention has a storage capacity that is up to 10 times greater than inorganic salt hydrates alone and is not restricted to operate at discrete temperatures. The ability of the PCM to exchange energy with the surroundings is attributed to its intrinsic propensity for water. These PCMs are made of a solid adsorbent and hygroscopic materials or a suitable hydrophilic substance. The method of incorporation and coupling these hybrid PCM devices with a heat pump and with the environment is the basis of the invention.

BRIEF DESCRIPTION OF THE INVENTION

A broad class of dynamic hybrid phase change materials (PCMs) is coupled to residential heat pumps to significantly increase heating and cooling efficiency, reduce primary energy consumption, and decrease greenhouse gas emissions. This invention supports the Department of Energy (DOE) goal to develop environmentally friendly, low energy consumption technology for existing and zero energy buildings (ZEBs). Significant achievement towards reducing primary fuel and reduction of greenhouse gases is possible with this invention.

The heat pump has; a refrigerant loop; a compressor in fluid communication with the refrigerant loop; at least one indoor heat exchanger in fluid communication with the refrigerant loop and in thermal communication with an indoor environment; at least one outdoor heat exchanger in fluid communication with the refrigerant loop and in thermal communication with an outdoor environment wherein the outdoor environment comprises at least one element selected from the group consisting of hybrid phase change material, soil, air, and moisture; at least one reversing valve in fluid communication with the refrigerant loop; at least one liquid metering device in fluid communication with the refrigerant loop; at least one control valve in fluid communication with the refrigerant loop; and a means for controlling the flow of said refrigerant loop.

DETAILED DESCRIPTION OF THE INVENTION

Figure 1:
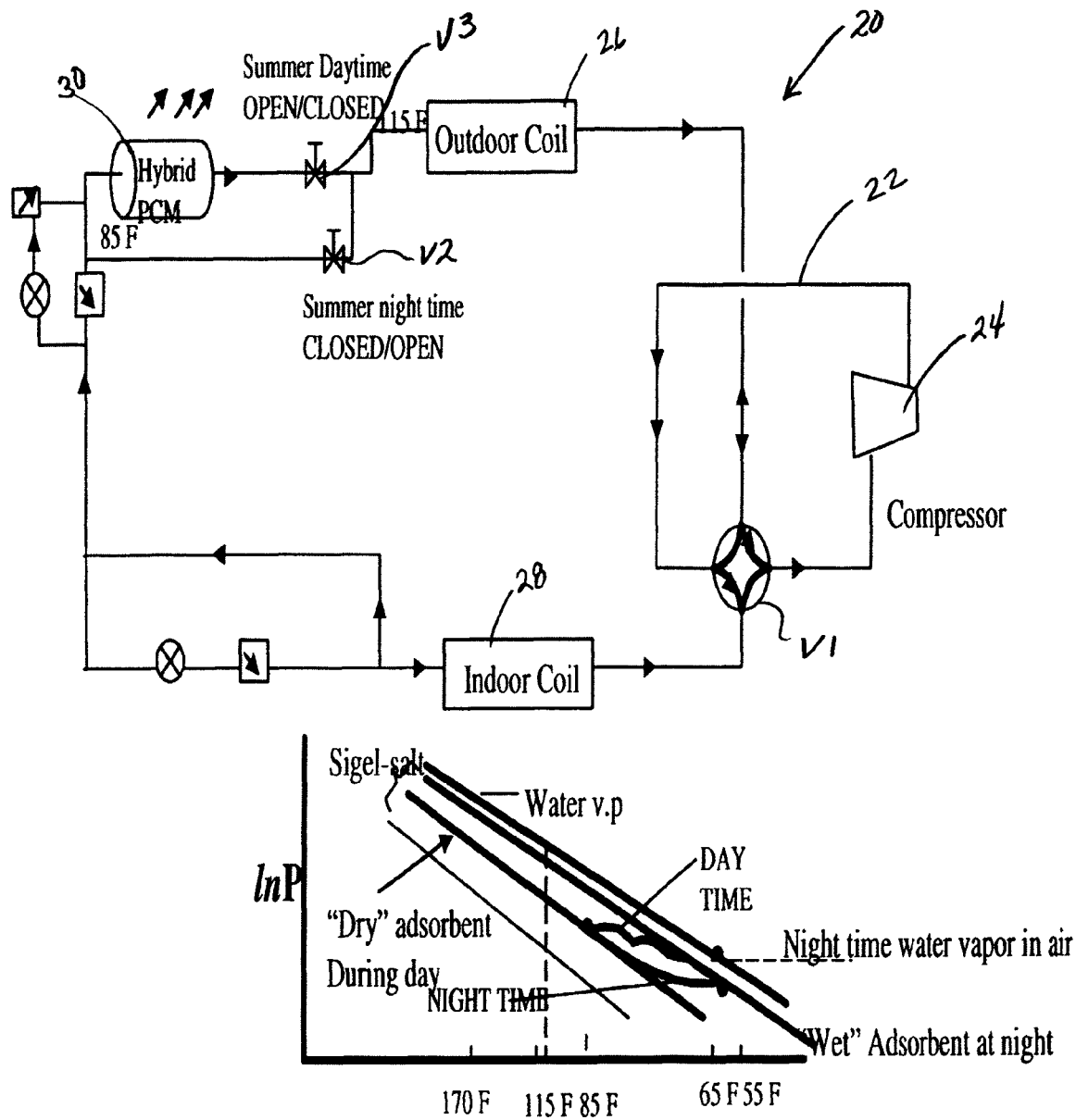
FIG. 1 shows nocturnally charged Super heat pump system with dynamic energy exchange with humidity in the air to provide thermal storage, outdoor coil subcooling and higher cooling efficiency.

Hybrid phase change materials (PCMs) of this invention are manufactured, packaged and configured for use in a heat pump cycle that significantly improves cooling and heating efficiencies. The following procedure is used to manufacture the PCM:

(1) Starting material is mesoporous silica gel of any appropriate type, for example, Type A, RD or KSKG. Silica gel consists mainly (>99%) of silicon dioxide ($SiO_2$) and trace amounts of Group I and Group II oxides. The mesoporous silica gel has at least one property selected from the group consisting of: molecular weight of approximately 60, specific surface area in the range of approximately 300-500 $m^2/g$, apparent density in the range of approximately 0.4-0.8 $g/cm^3$, pore volume in the range of approximately 0.8-1.2 $cm^3/g$.

(2) Group I & II halides are purified by fractional crystallization.

(3) The silica gel is heated in air approximately 463-503° K for about 2 hours. After cooling down to room temperature in a desiccator, it is impregnated with a saturated solution of the group I & II halide(s) by soaking the desiccated silica gel in the saturated solution for about 3-4 hours.

(4) The Group I & II halide(s) impregnated silica gel is filtered and pat dried with a paper towel. Residual water is removed by heating "dried" silica gel at about 473° K until no further weight loss is registered.

(5) Group I & II halide "doped" silica gel is placed around a finned heat exchanger. This assembly is then housed in a porous drainage pipe available from hardware stores. The PCM device is ready for installation in a preferred configuration with the heat pump.

Alternatively, other hydrophilic substances may be used if their water sorption properties are similar to the hybrid PCMs. In addition to the PCM, super absorbents such as derivatives of polyacrylamides may be used in a manner identical to that described to exchange moisture with the soil or with the ambient in the same configuration as that mentioned in FIGS. 1-5.

A unique feature is that the invention uses several physical principles to store and transfer thermal energy. Heat transfer between the hybrid PCM and its environs occurs by convection, conduction and water transport. Prior art on ground coupled systems is limited to conduction heat transfer between the heat exchange and the soil, whereas the prepared invention augments energy transfer through the sorption of moisture to and from the PCM.

The hybrid PCM operationally has 6 times higher thermal capacity compared to existing PCMs, ameliorates the problem of outdoor coil frosting, reduces primary energy consumption up to about 20% for space conditioning, allows peak load shifting while saving energy, is inexpensive and can be retrofitted.

Candidate PCM materials include, inorganic salts of Group I and II elements such as halides of calcium, strontium, lithium, sodium, cesium, etc. PCMs are not limited to inorganic salts but can be any hygroscopic or deliquescent substance that has sufficient water potential and water loading capacity.

FIGS. 1-5 show various examples of heat pumps (20). As shown in these figures, the heat pump (20) may comprise a refrigerant loop (22) and a compressor (24), an outdoor coil or heat exchanger (26), an indoor coil or heat exchanger (28), and a thermal storage device (30), each in fluid communication with the refrigerant loop (22). In these examples, the thermal storage device comprises a hybrid PCM, as described above. The heat pump (20) may include one or more valves (V) for selectively controlling the flow of refrigerant within the refrigerant loop (22). In addition, the heat pump (20) may include one or more temperature and/or pressure sensors (T, P) for monitoring temperature and/or pressure at various points within the refrigerant loop (22). In the first embodiment (FIG. 1), the thermal storage device (30) is coupled to the air and is charged nocturnally and discharged during the day when the cooling load demand is high. This embodiment is based on the periodic back and forth movement of adsorbed water between the PCM and the ambient air. The water inventory contained within the hybrid PCM materials is driven away by reject heat and is subsequently transported back to the hybrid PCM by its water potential for the cycle to repeat itself. Field experiments (hydronic) establish the cycle time, heat load and the effect of ambient humidity.

In the second embodiment (FIG. 2), the thermal storage device (30) is coupled to the ground in a manner that sequesters sorbed water in a bicameral chamber (38). This embodiment is applicable to the cooling as well as the heating cycles. This embodiment is akin to a phase change mechanism where the water adsorbed on the hybrid PCM evaporates, condenses drop-wise at the periphery and is reabsorbed by the hybrid PCM in a sealed, water-tight container. Heat rejection by this mechanism may be faster than in the first concept, but the cycle times and heat rejection rates may be different.

In the third embodiment (FIG. 3), the thermal storage device (30) allows dynamic exchange of water with the soil solution and, like the second embodiment, is applicable to the heating as well as the cooling cycle. In general, the embodiment includes open as well as sequestered exchanges of sorbed water with the environment and thermal storage for improving heat pump (20) performance and efficiency. Unique, environmentally friendly hybrid PCM (30) allows dynamic thermal storage, peak power shifting, lowers cycling losses, eliminates frosting losses and reverses cycle defrosting, and saves prime energy. The device permits heat pump (20) to extract and store heat from ground and air via dynamic exchange of water between soil solution, water vapor and PCM. This embodiment reduces systemic inefficiencies in heat pump (20), enables load shifting and saves electricity.

Figure 2:
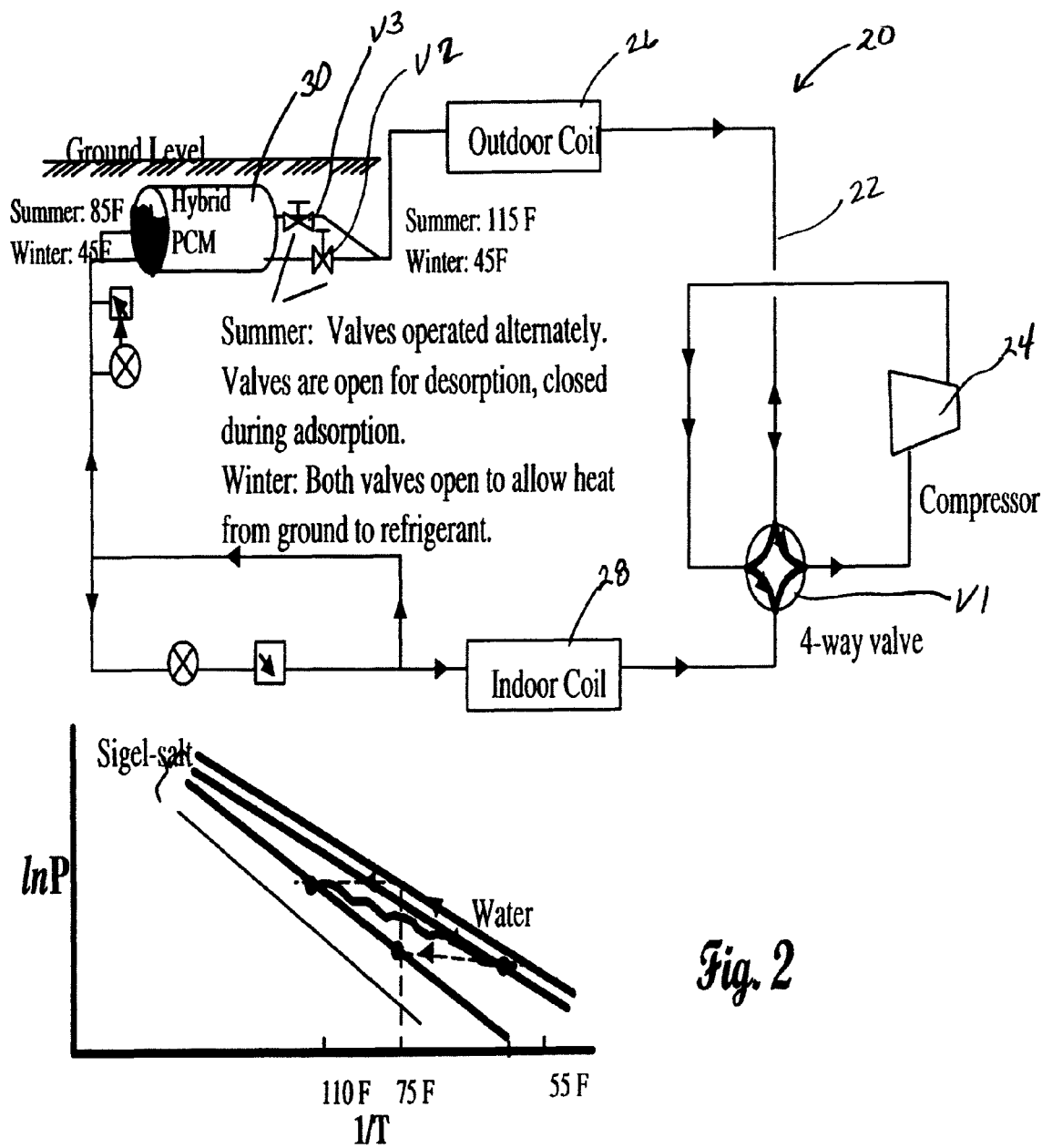
FIG. 2 shows a ground-coupled heat pump having sequestered water in bicameral chamber.
Figure 3:
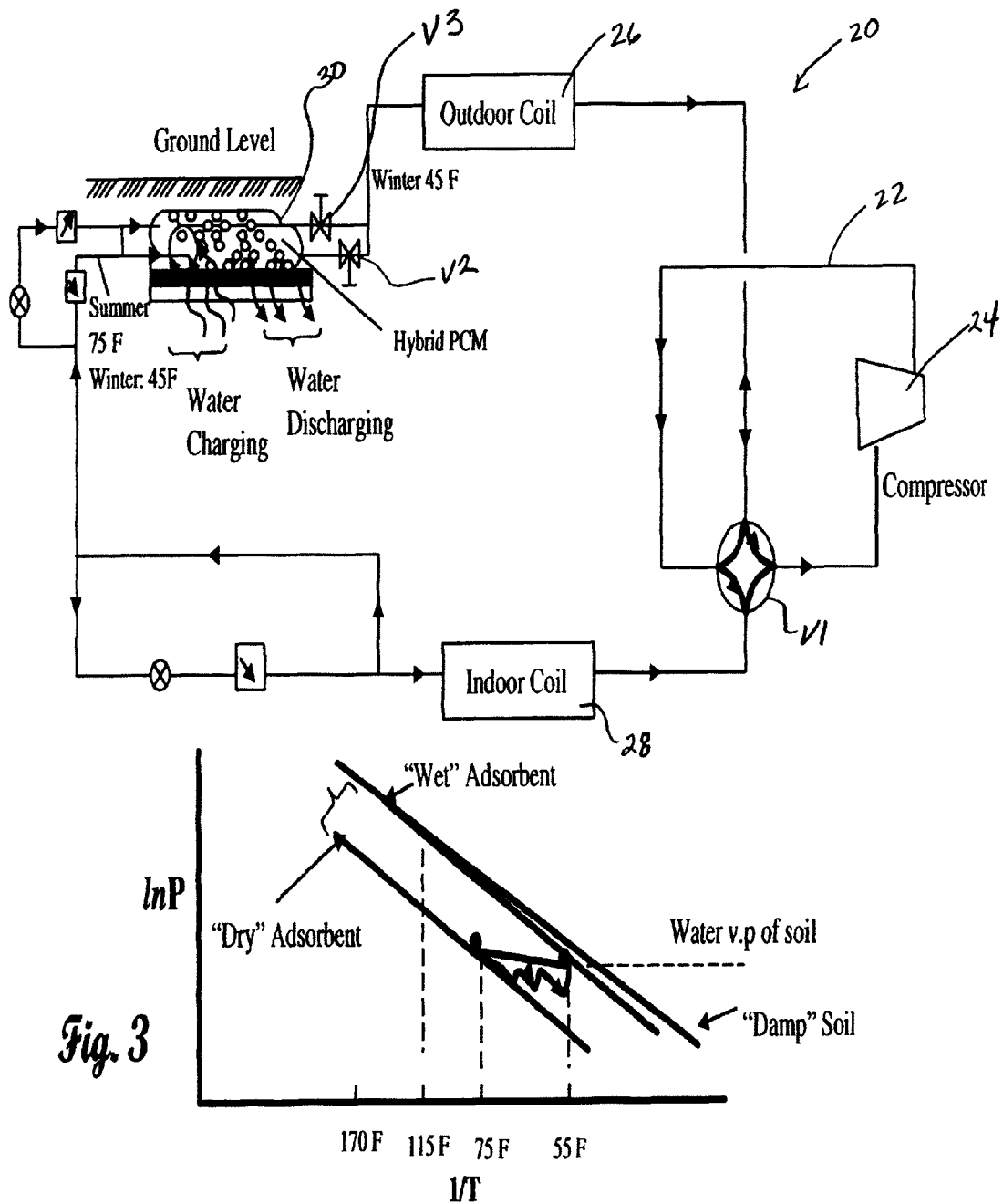
FIG. 3 shows a ground-coupled heat pump having free exchange of water with the soil.
Figure 4:
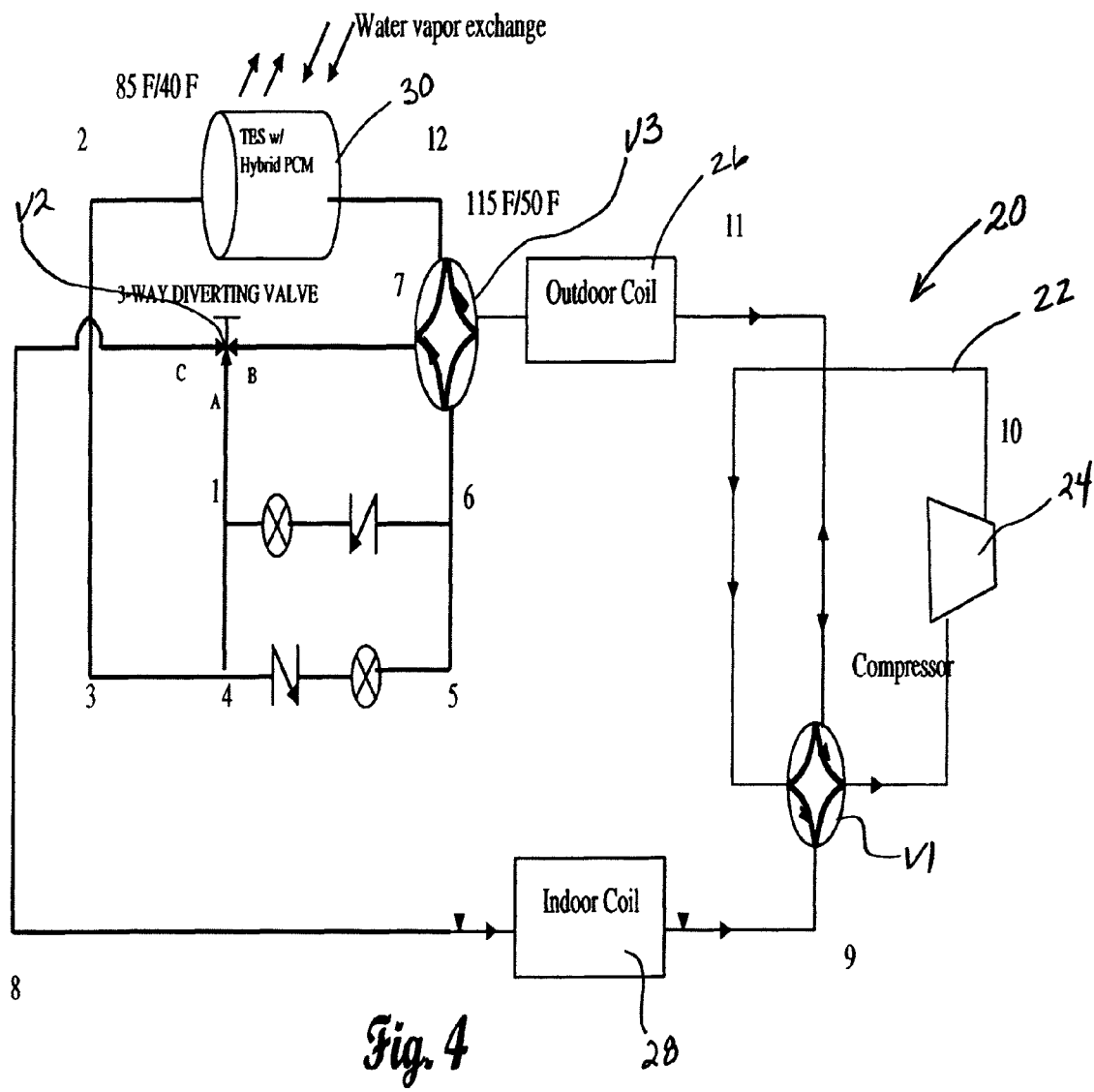
FIG. 4 shows an alternative embodiment using hybrid PCMs for space conditioning and cold storage.

An alternate embodiment encompassing four distinct modes of operation is shown in FIG. 4. These modes fulfill air conditioning (A/C) and heating applications for conditioned space and will effect a highly efficient heat pump (20) because of the way in which the thermal energy storage (TES) hybrid PCM (30) is incorporated in the heat pump cycle. The feature that distinguishes the alternate embodiment from the embodiments presented in FIGS. 1-3 is the ability to store cold by running the heat pump (20) to cool the TES (30) during off peak hours and subsequently using the stored cold to provide extra subcooling to the outdoor coil (26) to increase cycle efficiency, or to provide direct cooling to conditioned space. Operational modes for this embodiment are:

(1) Subcooler—Hybrid PCM Discharged; A/C operation pathway: 9-10-11-12-2-3-4-5-6-7-BC-8-9
(2) Hybrid PCM charging (actively cooled to ~40° F.); A/C operation pathway: 9-10-11-6-1-4-3-2-12-7-BC-8-9
(3) Hybrid PCM Bypass; A/C operation pathway: 9-10-11-6-1-AC-8-9
(4) Hybrid PCM Winter operation; Heating (underground unit) pathway: 9-8-CB-7-6-1-4-3-2-12-11-10-9

Figure 5:
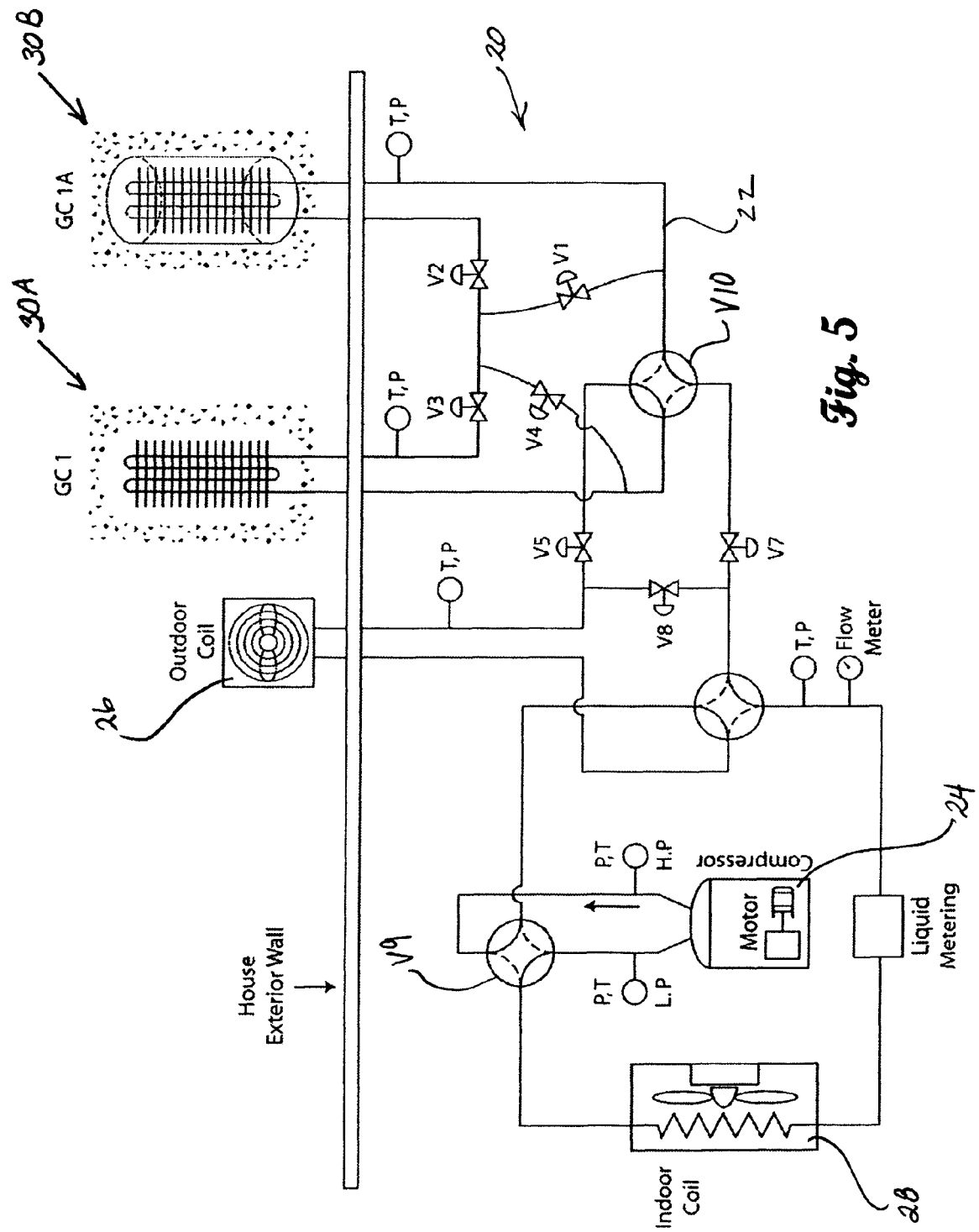
FIG. 5 shows major components of the ground-coupled system integrated with an air-to-air heat pump.

Another embodiment of the invention shown in FIG. 5 has the following operational choices:

(1) using only the outdoor coil (26) of an air-to-air heat pump (20) to establish the baseline energy consumption
(2) using the outdoor air-cooled coil (26) first and subsequently either of the two hybrid PCM modules (30A, 30B)
(3) using either of the hybrid PCM modules (30A, 30B) first followed by the outdoor coil (26)
(4) using the hybrid PCM modules (30A, 30B) only and completely bypassing the outdoor air-cooled coil (26).

These flexibilities provide a control strategy for how to make the best use of the ground-coupled system for maximizing energy and peak load savings. For example, in the early hours during summer when the outdoor temperature is relatively low, we might use the outdoor coil (26) exclusively until the daytime temperature gets to the upper 70's or 80's before switching to the ground-coupled outdoor coil (30) which can reject heat to the cooler than ambient ground at around 55° F. Under other weather conditions, it may be worthwhile to operate the ground-coupled heat exchanger (30) longer to maximize energy efficiency. This depends on the performance of the ground-coupled heat exchanger (30). Another scenario might be to take maximum advantage of extracting heat from the ground during winter operations. Monitoring the compressor energy consumption, pressure and temperature on the high and suction side, the refrigerant flow rate and the temperatures downstream of the outdoor (26) and hybrid PCM modules (30A, 30B) and the temperature field around the hybrid PCM ground-coupled module are key measurements to establish the summer and winter time operating parameters and COP. These options are imbedded in the schematic shown in FIG. 5.

What is claimed is:

1. A heat pump comprising:
a refrigerant loop;
a compressor in fluid communication with said refrigerant loop;
at least one indoor heat exchanger in fluid communication with said refrigerant loop and in thermal communication with an indoor environment;

at least one outdoor heat exchanger in fluid communication with said refrigerant loop and comprising a phase change material in thermal communication with said refrigerant loop;

wherein the phase change material is disposed within a porous housing, the porous housing is disposed in the ground, and the phase change material is in direct fluid communication with the ground through the porous housing.

2. The heat pump of claim 1 further comprising:
at least one reversing valve in fluid communication with said refrigerant loop;
at least one liquid metering device in fluid communication with said refrigerant loop;
at least one control valve in fluid communication with said refrigerant loop; and
a means for controlling the flow of said refrigerant loop.

3. The heat pump of claim 2 wherein said means for controlling further comprises a thermal energy storage mode, an air-conditioning mode, and a heating mode.

4. The heat pump of claim 2 wherein said means for controlling further comprises a means for activating the at least one outdoor heat exchanger in response to a predetermined control strategy.

5. The heat pump of claim 4 wherein said control strategy further comprises measuring at least one parameter selected from the group consisting of compressor energy consumption, high-side refrigerant pressure, high-side refrigerant temperature, suction-side refrigerant pressure, suction-side refrigerant temperature, refrigerant flow rate, refrigerant temperature downstream of said at least one outdoor heat exchanger, and the environmental temperature near said at least one outdoor heat exchanger.

6. The heat pump of claim 1 wherein the phase change material is in fluid communication with the air.

7. A heat pump comprising:
a refrigerant loop;
a compressor in fluid communication with said refrigerant loop;
at least one indoor heat exchanger in fluid communication with said refrigerant loop and in thermal communication with an indoor environment; and
at least one outdoor heat exchanger in fluid communication with said refrigerant loop and comprising a phase change material in thermal communication with said refrigerant loop;

wherein the phase change material comprises a solid sorbent material and the solid sorbent material is in fluid communication with the ground.

8. The heat pump of claim 1 wherein the phase change material is a desiccant material.

9. The heat pump of claim 1 wherein the phase change material comprises a silica gel.

10. The heat pump of claim 9 wherein the phase change material comprises inorganic salts of Group I and II elements.

11. The heat pump of claim 1 wherein the phase change material is in fluid communication with the ground.

12. The heat pump of claim 7 further comprising:
at least one reversing valve in fluid communication with said refrigerant loop;
at least one liquid metering device in fluid communication with said refrigerant loop;
at least one control valve in fluid communication with said refrigerant loop; and
a means for controlling the flow of said refrigerant loop.

13. The heat pump of claim 12 wherein said means for controlling further comprises a thermal energy storage mode, an air-conditioning mode, and a heating mode.

14. The heat pump of claim 12 wherein said means for controlling further comprises a means for activating the at least one outdoor heat exchanger in response to a predetermined control strategy.

15. The heat pump of claim 14 wherein said control strategy further comprises measuring at least one parameter selected from the group consisting of compressor energy consumption, high-side refrigerant pressure, high-side refrigerant temperature, suction-side refrigerant pressure, suction-side refrigerant temperature, refrigerant flow rate, refrigerant temperature downstream of said at least one outdoor heat exchanger, and the environmental temperature near said at least one outdoor heat exchanger.

16. The heat pump of claim 7 wherein the phase change material is in fluid communication with the air.

17. The heat pump of claim 7 wherein the phase change material is a desiccant material.

18. The heat pump of claim 7 wherein the phase change material comprises a silica gel.

19. The heat pump of claim 18 wherein the phase change material comprises inorganic salts of Group I and II elements.

* * * * *